United States Patent [19]

Buide et al.

[11] 3,903,310

[45] Sept. 2, 1975

[54] HIGH POLYUNSATURATED NON-DAIRY WHIPPED PRODUCTS

[75] Inventors: Norma F. Buide, New York; Joaquin C. Lugay, Thornwood; Rex J. Sims, Pleasantville, all of N.Y.

[73] Assignee: General Foods Corporation, Tarrytown, N.Y.

[22] Filed: Dec. 10, 1973

[21] Appl. No.: 423,326

[52] U.S. Cl. .............. 426/564; 426/602; 426/656
[51] Int. Cl.² ........................................ A23J 3/02
[58] Field of Search ........................... 426/163, 164

[56] References Cited
UNITED STATES PATENTS

| | | | |
|---|---|---|---|
| 3,170,800 | 2/1965 | Pader | 426/163 |
| 3,236,658 | 2/1966 | Little | 426/164 |
| 3,702,768 | 11/1972 | Finucane et al. | 426/164 |

*Primary Examiner*—A. Louis Monacell
*Assistant Examiner*—J. M. Hunter
*Attorney, Agent, or Firm*—Thaddius J. Carvis; Daniel J. Donovan

[57] ABSTRACT

A whipped, dessert-type product is provided wherein the ratio of the weight of polyunsaturated fat to the weight of saturated fat (P/S) is greater than about 0.3. Stability and improved whipping and texture are provided by the addition of small but effective amounts of a protein hydrolysate.

8 Claims, No Drawings

HIGH POLYUNSATURATED NON-DAIRY WHIPPED PRODUCTS

BACKGROUND OF THE INVENTION

The present invention relates to a whipped, dessert-type product. More particularly, the invention relates to whipped products of the oil-in-water emulsion type, wherein the oil phase has a relatively high degree of polyunsaturation.

The production of stable, especially freeze-thaw stable, whipped oil-in-water emulsions of this type has long troubled those skilled in the art. There have been no commercially successful products of this type, probably because the whips produced are not stable, even with the use of protein in relatively large amounts.

whipped food products are well known and find a wide variety of uses. Anomg these whipped products are those based upon egg whites and those employing saturated fats in oil-in-water emulsions. The whips based upon egg whites are not suitable substitutes for natural whipped cream and are known to be unstable in the presence of oils. Several workers have proposed substituting protein hydrolysates for egg whites in oil-free whips. For example, in U.S. Pat. No. 2,588,419 to H. E. Sevall et al., a whipping composition for preparing whipped products of high sugar content is disclosed comprising water-soluble degraded soy protein and sodium phosphate. The sodium phosphate serves as a stabilizer for the degraded protein when the composition is whipped in an aqueous medium. No fat is employed in the whipped products disclosed by this reference. Further exemplary is the disclosure of Canadian Pat. No. 663,556 to R. J. Moshy, wherein the use of hydrolyzed fish protein as a whipping agent is suggested for desserts and the like. Example IV of this patent indicates that whips prepared in accordance with its teachings have an oil stability of well under 1%.

Whipped products based upon oil-in-water emulsions have had a good degree of success lately; however, these whips have required high levels of saturated fats and typically have P/S values close to zero. When it was attemped to increase this ratio to a more suitable value, the amount of liquid oil required would decrease whip stability.

Thus, while the art has long been desirous of stable, whipped oil-in-water emulsions containing high levels of polyunsaturated fats, and has been aware of non-fat-containing whipped products employing hydrolyzed protein, no one has heretofore recognized that a protein hydrolysate could be employed to provide high P/S whipped oil-in-water emulsion systems.

SUMMARY OF THE INVENTION

Accordingly, it is an object of the present invention to provide stable, whipped oil-in-water emulsions high in polyunsaturates.

It is another object of the present invention to provide freeze-thaw stable whipped oil-in-water emulsions containing high levels of polyunsaturates.

It is yet another object of the present invention to provide stable, whipped oil-in-water emulsions which are high in polyunsaturates yet exhibit a texture and mouthfeel similar to that of natural whipped cream.

These and other objects are accomplished according to the present invention which provides an oil-in-water emulsion system comprising: an oil phase having a P/S of about 0.3, water, carbohydrate, emulsifiers, stabilizers, and an amount of a protein hydrolysate effective to provide a stable whip. The hydrolysate of sodium caseinate is preferred, and is effective at low concentrations; e.g., on the order of less than about 1.5%, and as low as about 0.005% to 0.01%.

DETAILED DESCRIPTION OF THE INVENTION

The present invention is concerned with the preparation of whipped oil-in-water emulsions wherein the oil phase has a relatively high degree of polyunsaturation. Typically, the P/S will be greater than about 0.3, and preferably, from about 0.8 to about 1.0. To obtain these high degrees of polyunsaturation, a high P/S fat is employed alone or in combination with a low P/S fat.

According to the present invention, P/S is defined as the ratio of the total weight of essential fatty acids in the oil phase, as determined by Canadian Food and Drug Directorate Method FA-59 (Dec. 1967), to the total weight of the saturated fats as measured by gas chromatography. The preferred gas chromotographic method employs a Perkin Elmer Model 900 gas chromatograph. The column is 6'× ⅛" OD filled with 12% DEGS on 70/80 mesh Anakrom ABS (Analabs, Inc.) or 12% EGSS-X on 80/100 Gas Chrom P (Applied Science Labs, Inc.). The oven temperature is usually 200°C and the helium flow rate approximately 50 ml/minute. The methyl esters are prepared by a modified version of the Metcalfe procedure. Two drops (25–100 mg) of fat is placed in a 25 ml volumetric flask along with 4.0 ml 0.5N NaOH in McOH and heated on the steambath until the fat globules dissolve (about 5 min.). Upon cooling 5.0 ml 14% $BF_3$.MeOH is added and the mixture is heated gently for 2–5 minutes after which 10–15 ml saturated NaCl and 2–5 ml $CS_2$. The flask is stoppered, shaken vigorously for one minute and allowed to stand about five minutes to allow the layers to separate. From 1 to 3 ml of the organic layer is injected into the chromatograph. The peaks are quantitized by electrical integration (Infotronics Model CRS-104).

The high P/S fat, is selected principally on the basis of taste, degree of unsaturation and compatibility with the low P/S fat. Exemplary of suitable high P/S fats are safflower oil, corn oil, soybean oil, cottonseed oil, and sunflower oil. Desirably, these fats are low in lauric fats.

Liquid oils tend to coat the palate with an undesirable oil film. Accordingly, because the high P/S fats are typically liquid at eating temperatures, it is usually necessary to employ such a fat in combination with a normally solid, low P/S fat.

For the low P/S fat, those having high solids contents at the proposed whipping and storage temperatures and a rapid melt down to a low solids content at body temperature are particularly preferred. The usual topping fats of coconut origin are acceptable. For example, coconut oil which has been hydrogenated to have a melting point of about 90° – 94°F is especially suitable. Further exemplary are hydrogenated cottonseed oil, hydrogenated corn oil, hydrogenated soybean oil, hydrogenated peanut oil, hydrogenated olive oil, etc. This list is by no means exhaustive, but is merely exemplary of fats which can be employed. The selection of a particular one or combination of these fats is limited only by the considerations that it be edible and provide the desired working and eating characteristics.

The low P/S fat, or the two types of fats together, are employed to obtain a fat portion having a P/S of greater than at least about 0.3. Typically, the oil phase will contain at least about 10% of a liquid oil having a P/S of from about 6 to about 9 to obtain a preferred blend having a P/S of from about 0.8 to about 1.0.

In preparing the whipped, oil-in-water emulsion system according to the present invention, the fat portion is combined with water, carbohydrate, emulsifiers, stabilizers, and an effective amount of a protein hydrolysate. For the purposes of the present invention, an effective amount of protein hydrolysate is defined to mean an amount which, by itself or in combination with a protein such as sodium caseinate, provides sufficient functionality to impart good whipping properties and stability to whipped toppings of the type described herein.

The hydrolysate can be obtained from commercial sources or prepared according to any suitable method. It can be derived from any number of edible protein sources. Protein substances preferred as source materials are naturally confined to those available in quantity at reasonable cost. Prominent among these are casein, sodium caseinate, soy protein, egg white protein, egg yolk protein, milk whey protein, fish protein, cottonseed protein, sesame protein, and meat protein. It is presently believed that proteins highest in organic phosphorus are to be preferred according to the present invention. Thus, sodium caseinate is a preferred protein source.

Any of the known procedures for hydrolyzing protein which can reduce the molecular size of the protein material to an average molecular weight of from about 300 to about 15,000, and preferably from about 1,000 to 7,000 can be employed. Preferably, the proteins are treated with an edible bacterial proteinase under controlled conditions to give a limited amount of hydrolysis. Typical of the enzymes which can be used alone or in combination to obtain the desired hydrolysis are papain, bromelin, ficin, pepsin, trypsin, chymotrypsin, bacterial protease (e.g. from B. subtilis), and fungal protease (e.g. from the aspergillus oryzae-niger group). These enzymes, used alone or in combination at the appropriate reaction conditions, effectively hydrolyze the proteins to the desired degree. Typically, the protein is dispersed in distilled water at a temperature of from about 25° to 60°C under mild agitation. The protein can be employed at concentrations of from about 5% to 25% based on the weight of the dispersion. The enzyme is added in an amount ranging from about 0.1% to about 1.0% based on the weight of the protein. The pH of the reaction mixture is controlled in known manner at from about 2 to 9 during the hydrolysis. The hydrolysis may take from about 2 minutes to about 7 hours depending upon the particular reaction conditions, protein sources and enzymes employed within the suggested guidelines. The hydrolysate can be used as is or separated and dried.

It is not unusual, due to the use of particular protein sources or processing techniques, for the hydrolysate to have an off flavor. The presence of an off flavor does not indicate a decreased functionality of the hydrolysate and, in most cases, is not noticeable when the hydrolysate is employed at low levels. Where desired, the impact of the off flavor can be reduced by known techniques, including masking by complimentary flavors.

It is often desirable to employ a protein, such as sodium caseinate, along with the hydrolysate. It is found that the protein functions as a whipping agent, but alone cannot provide a stable whip. And, the hydrolysate, while having some whipping potential serves mainly to stabilize the whip by binding water, presumably, in large part due to an increased hydrogen bonding with the water in the whip.

A carbohydrate is generally employed in the composition to provide the desired sweetness. Thus, sugars such as sucrose, dextrose, glucose, lactose, maltose, invert sugar, and mixtures thereof may be utilized. some carbohydrates such as dextrose may also be employed for their water binding characteristics. Other carbohydrates such as starches can be added where a modified somewhat pudding-like consistency is desired.

Emulsifiers are necessary ingredients of the composition of the present invention and can be added in amounts on the same order as in the prior art oil-in-water emulsions. A wide variety of emulsifiers may be employed. Among the more suitable are: hydroxylated lecithin; mono- or diglycerides of fatty acids, such as monostearin and monopalmitin; polyoxyethylene ethers of fatty esters of polyhydric alcohols, such as the polyoxyethylene ethers of sorbitan monstearate; fatty esters of polyhydric alcohols, such as sorbitan monostearate; mono- and diesters of glycols and fatty acids, such as propylene glycol monostearate, propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate. The fatty acids employed in the preparation of the emulsifiers include those derived from beef tollow, and coconut, cottonseed, palm, peanut, soybean and marine oils. Preferably a combination of emulsifiers is employed; for example, a combination of polyoxyethylene (20) sorbitan monostearate and sorbitan monostearate can be used.

The whipped, dessert-type compositions of the present invention also include one or more non-proteinaceous stabilizers. These stabilizers are preferably natural, i.e., vegetable, or synthetic gums and may be, for example, carrageenin, guar gum alginate, and the like or carboxymethylcellulose, ethylcellulose ether and the like, and mixtures thereof. Typically, a gum or combination of gums is employed with a sugar, e.g. dextrose, carrier. It is an advantage of the present invention that the amount of these stabilizers necessary can be reduced over the amounts required in prior art whips.

Other ingredients known to those skilled in the art may also be employed to impart their characteristic effects to the whipped topping compositions of the present invention. Typical of such ingredients are flavoring agents, colorants, vitamins, minerals, and the like. Suitable flavoring agents can be employed to impart vanilla, cream, chocolate, coffee, maple, spice, mint, butter, caramel, fruit and other flavors. Additionally, the use of certain polyols such as sorbitol and mannitol can be employed to modify the mouthfeel of the topping. Furthermore, other additives such as phosphates and the like may be employed for their known functions.

The amounts of fat, hydrolyzed protein, emulsifier, stabilizer, carbohydrate, and optionally included ingredients as well as the amount of water employed in the preparation of whipped, dessert-type compositions according to the present invention can be varied over relatively wide limits. The amount of fat will be sufficient to provide a stable whip which has good mouthfeel and yet, upon melting, does not leave an undesirable film on the palate. Sufficient amounts of hydrolyzed protein, emulsifier and stabilizer will be used to impart good whipping properties to the composition and to afford some stability to the whip. Further, the amount of carbohydrate will be varied over a range sufficient to impart the desired sweetness level to the composition.

The relative amounts of these ingredients can be widely varied depending upon the end use, product stability, degree of whip and the mouthfeel of the desired product. However, the relative amounts of the various ingredients will generally be within the following ranges:

| Ingredient | Weight % |
| --- | --- |
| Fat | 10–30 |
| Emulsifier | 0.5–2.0 |
| Stabilizer | 0.05–2.0 |
| Water | 40–70 |
| Carbohydrate | 15–30 |
| Flavoring agent | 0.5–2.0 |
| Colorant | 0.01–0.05 |
| Protein Hydrolysate | 0.005–1.5 |
| Protein | 0–1.5 |

A preferred method for preparing a whipped topping product comprises blending all of the ingredients, except for the carbohydrate and the optionally included ingredients such as flavoring agents and coloring, in the desired ratios. The ingredients are heated prior to or during blending. The blended ingredients are then passed through a homogenizer of the typical dairy type. Although homogenization may be accomplished in one stage, it is carried out in two stages for best results. Preferably, the pressure during the first stage is maintained at a minimum of about 2,000 psi and a maximum of about 10,000 psi, most preferably about 2,500 psi, and the pressure during the second stage is maintained at about 500 to 1,000 psi. The mix is usually maintained at a temperature of from about 60° to 75°C during homogenization. The carbohydrate and the optionally homogenization to form a whippable emulsion. This emulsion is cooled to temperature of from about 0° to 25°C and passed through a whipper for the incorporation of air or an inert gas such as nitrogen, carbon dioxide, nitrous oxide or the like. The whipper may be of conventional construction such as a Hobart mixer or a Votator heat exchanger that permits cooling of the emulsion to temperatures of about 5° to 15°C, preferably 10°C, during whipping. The emulsion can be whipped to an overrun of from about 100% to 500%, packaged and frozen if desired.

It has further been determined that the texture of the product after a freeze-thaw cycle, is markedly improved where the emulsion is aged at about 5° to 15°C for from about 30 minutes to 2 hours prior to whipping. This is probably due to a more complete crystallization of the fat prior to whipping which prevents a subsequent solidification and destruction of the whip during freezing.

A frozen, whipped topping prepared in this manner remains smooth after several freeze-thaw cycles, and does not curdle upon prolonged refrigerator storage. To use the frozen, whippedtopping composition, the product is simply defrosted, for example, by being left overnight in the refrigerator.

The following examples are presented for the purposes of further illustrating and explaining the present invention, and are not to be taken as limiting in any sense. Unless otherwise indicated all parts and percentages are by weight.

EXAMPLE I

A whipped topping having a P/S of about 8 is prepared from the following ingredients:

| Ingredient | Weight % |
| --- | --- |
| Safflower oil | 10.5 |
| Sucrose | 16.5 |
| Dextrose | 3.1 |
| Myverol-18-06 Glycerol Monostearate | 2.1 |
| SMG Succinoylated Monoglycerides | 0.2 |
| Sodium caseinate hydrolysate | 1.3 |
| Water | 66.3 |
| | 100.0 |

$Na_2CO_3$ sufficient to bring emulsion to pH 7.

The sodium caseinate hydrolysate is prepared by first dispersing 100 parts of sodium caseinate in 900 parts of distilled water at 50°C. Then, bacterial protease Novo (BPN) is added at 1% solids basis with vigorous stirring. After incubation at 50°C for thirty minutes, the mixture is heated to 80°C to inactivate the enzyme. The hydrolysate is then freeze dried.

To prepare the whipped emulsion, a first phase is prepared by blending and melting the safflower oil and the glycerol monostearate at 80°C. A second phase is then prepared by blending the water and the succinoylated monoglycerides at 80°C and adding thereto the sugar, dextrose and hydrolysate. The two phases are admixed and emulsified at about 70°C in a Waring Blendor at high speed for three minutes, adding sufficient $Na_2CO_3$ to bring the pH to 7. The resulting emulsion is cooled to 10°C in an ice bath and then whipped at high speed in a Kitchenaid mixer for five minutes.

The whip is evaluated for % overrun, viscosity and freeze thaw stability. The overrun is determined by weighing a known volume of whip and calculating according to the following equation:

$$\% \text{ overrun} = \frac{100\% \times \text{volume (ml)}}{\text{whip weight (gm)}} - 100\%$$

The viscosity is measured at 20 rpm using Synchro-Lectric Brookfield Synchro-Letric Viscometer having a 35 mm T-bar spindle fixed on a helipath. The freeze-thaw stability is determined by freezing at 0°F overnight, removing a cylindrical plug, defrosting at 5°C and noting the number of days required for the whip to flow into the void created by removal of the plug.

This whip exhibits the following characteristics:

| | |
| --- | --- |
| % overrun | = 567 |
| viscosity | = 23 |
| stability(days) | = 7 |

EXAMPLE II

A whipped topping having a P/S of about 0.5 is prepared from the following ingredients:

| Ingredient | Weight % |
|---|---|
| ADM 6-170 hydrogenated soybean oil | 23.00 |
| Safflower oil | 2.58 |
| Sucrose | 23.04 |
| Drewpone 60 polyoxyethylene (20) Sorbitan monostearate | 0.60 |
| Gum stabilizer mix | 0.50 |
| Alcolex-Z-6 hydroxylated lecithin | 0.40 |
| Vanilla extract | 1.60 |
| Color and flavor | 0.14 |
| Sodium caseinate hydrolysate | 1.14 |
| Water | 47.00 |

The hydrolysate is prepared as that in Example I except that the incubation was carried on for 90 minutes.

To prepare the whipped emulsion, a first phase is prepared by dry blending the sucrose, gum stabilizer, and sodium caseinate hydrolysate, and adding the blend to the water with stirring at 80°C. A second phase, containing the ADM-6-170 hydrogenated soybean oil, the hydroxylated lecithin, polyoxyethylene (20) sorbitan monostearate, and safflower oil, is prepared by blending these ingredients at 80°C. These two phases plus the color, flavor and vanilla extract are mixed and then emulsified at about 70°C at high speed in a Waring Blendor. The emulsion is then homogenized in a Manton-Gaulin homogenizer at 7500 pounds first stage pressure and 500 pounds second stage pressure. The emulsion is then cooled to 10°C and whipped in a one quart Hobart mixer at high speed.

This whip exhibits the following characteristics:

% overrun = 197
viscosity = 45
stability = 5 ml/pint after one week

Many modifications and variations of the present invention will be apparent to those skilled in the art upon reading the above specification. It is intended that all of these modifications and variations be included within the scope of the present invention which is defined by the following claims.

What is claimed is:

1. A whippable oil-in-water emulsion composition comprising:
   a. 10%–30% of a fat portion having a P/S of greater than 0.3,
   b. 15%–30% carbohydrate,
   c. 40%–70% water,
   d. emulsifier,
   e. stabilizer, and
   f. 0.005%–1.5% of a protein hydrolysate having an average molecular weight within the range of from about 300 to about 15,000, the amount of the protein hydrolysate being effective to provide a stable whipped topping.

2. A composition according to claim 1 wherein the fat portion comprises at least about 10% of a liquid oil having a P/S of from about 6 to about 9.

3. A composition according to claim 1 wherein the fat portion comprises safflower oil.

4. A composition according to claim 1 which includes sodium caseinate.

5. A composition according to claim 1 wherein the protein hydrolysate comprises the hydrolysate of sodium caseinate.

6. A composition according to claim 5 which includes sodium caseinate.

7. A composition according to claim 6 wherein the fat portion comprises at least about 10% of a liquid oil having a P/S of from about 6 to about 9.

8. A composition according to claim 7 wherein the liquid oil comprises safflower oil.

* * * * *